United States Patent [19]

Onizaki et al.

[11] Patent Number: 4,862,984
[45] Date of Patent: Sep. 5, 1989

[54] AMPHIBIOUS AIR CUSHION VEHICLE

[75] Inventors: Takashi J. Onizaki, Ignace; Stephen L. Oshust, Thunder Bay, both of Canada

[73] Assignee: Toso Enterprises, Ltd., Thunder Bay, Canada

[21] Appl. No.: 182,967

[22] Filed: Apr. 18, 1988

[51] Int. Cl.⁴ .............................................. B60V 1/15
[52] U.S. Cl. ..................................... 180/120; 180/127
[58] Field of Search ................ 180/116, 117, 118, 119, 180/120, 121, 122, 124, 125, 126, 127, 128, 129; 414/676

[56] References Cited

U.S. PATENT DOCUMENTS

| | | |
|---|---|---|
| 3,066,753 | 12/1962 | Hurley et al. ....................... 180/120 |
| 3,117,545 | 1/1964 | Warner . |
| 3,127,949 | 4/1964 | Harter . |
| 3,208,543 | 9/1965 | Crowley ............................. 180/120 |
| 3,211,124 | 10/1965 | Mantle ................................ 180/124 |
| 3,262,510 | 7/1966 | Froehler ............................. 180/122 |
| 3,322,223 | 5/1967 | Bertelsen ............................ 180/120 |
| 3,342,278 | 9/1967 | Cocksedge ......................... 180/122 |
| 3,429,395 | 2/1969 | Beardsley ........................... 180/124 |
| 3,612,208 | 10/1971 | Ferguson ............................ 180/120 |
| 3,685,607 | 8/1972 | Eglen . |
| 3,869,020 | 3/1975 | Holland .............................. 180/120 |
| 4,046,215 | 9/1977 | Heitanen et al. ................ 180/120 X |

Primary Examiner—Charles A. Marmor
Attorney, Agent, or Firm—Donald A. Kettlestrings

[57] ABSTRACT

An amphibious air cushion vehicle includes a body defining an air containment wall, and an inflatable tube is attached to the body and defines a rearward opening. A fan is positioned within the body to force pressurized air into the compartment, and a gate is provided in operative relationship with the body and with the opening for selectively enabling pressurized air to exit rearwardly through the opening from the compartment to impart forward motion to the vehicle.

18 Claims, 5 Drawing Sheets

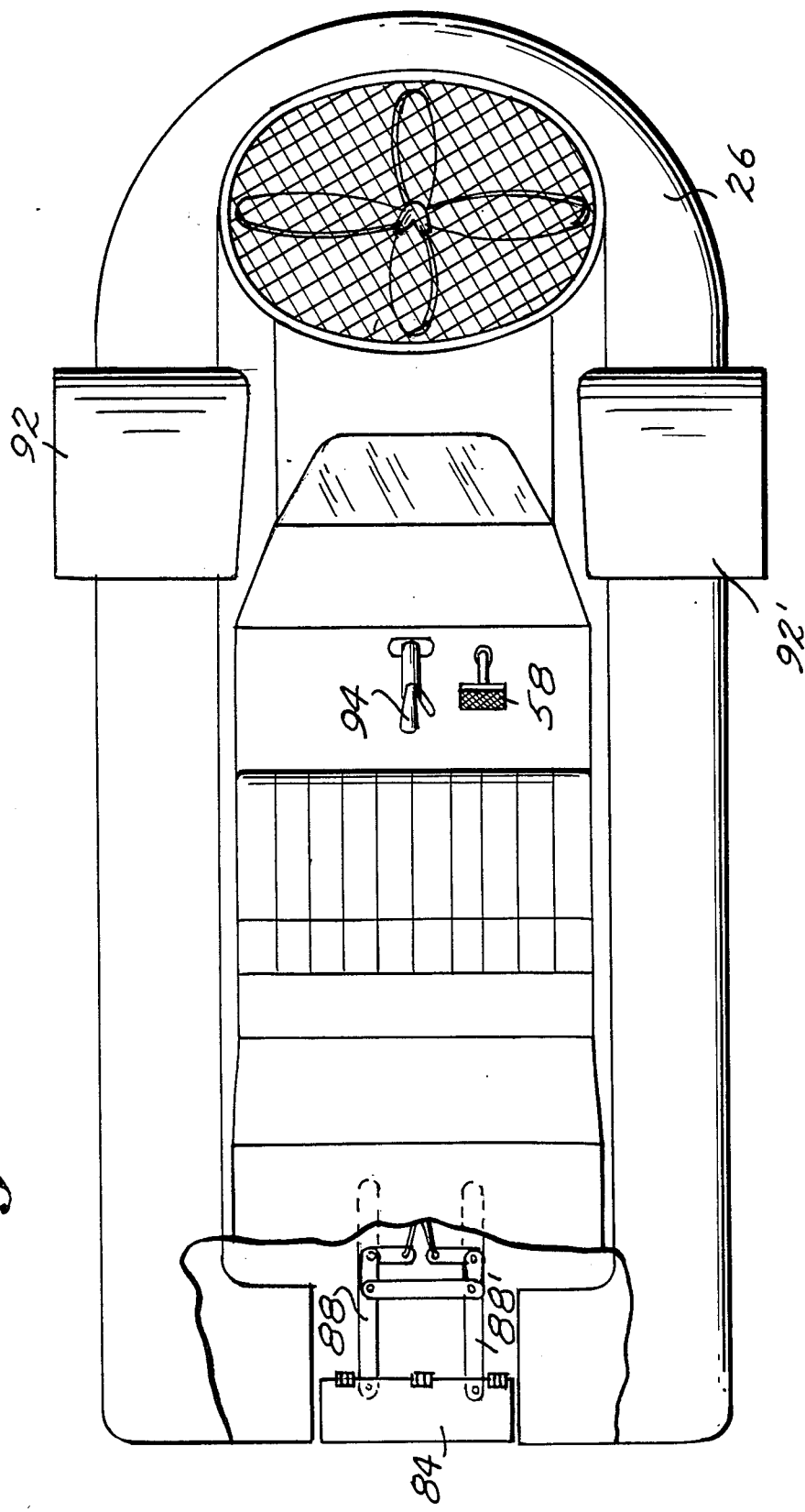

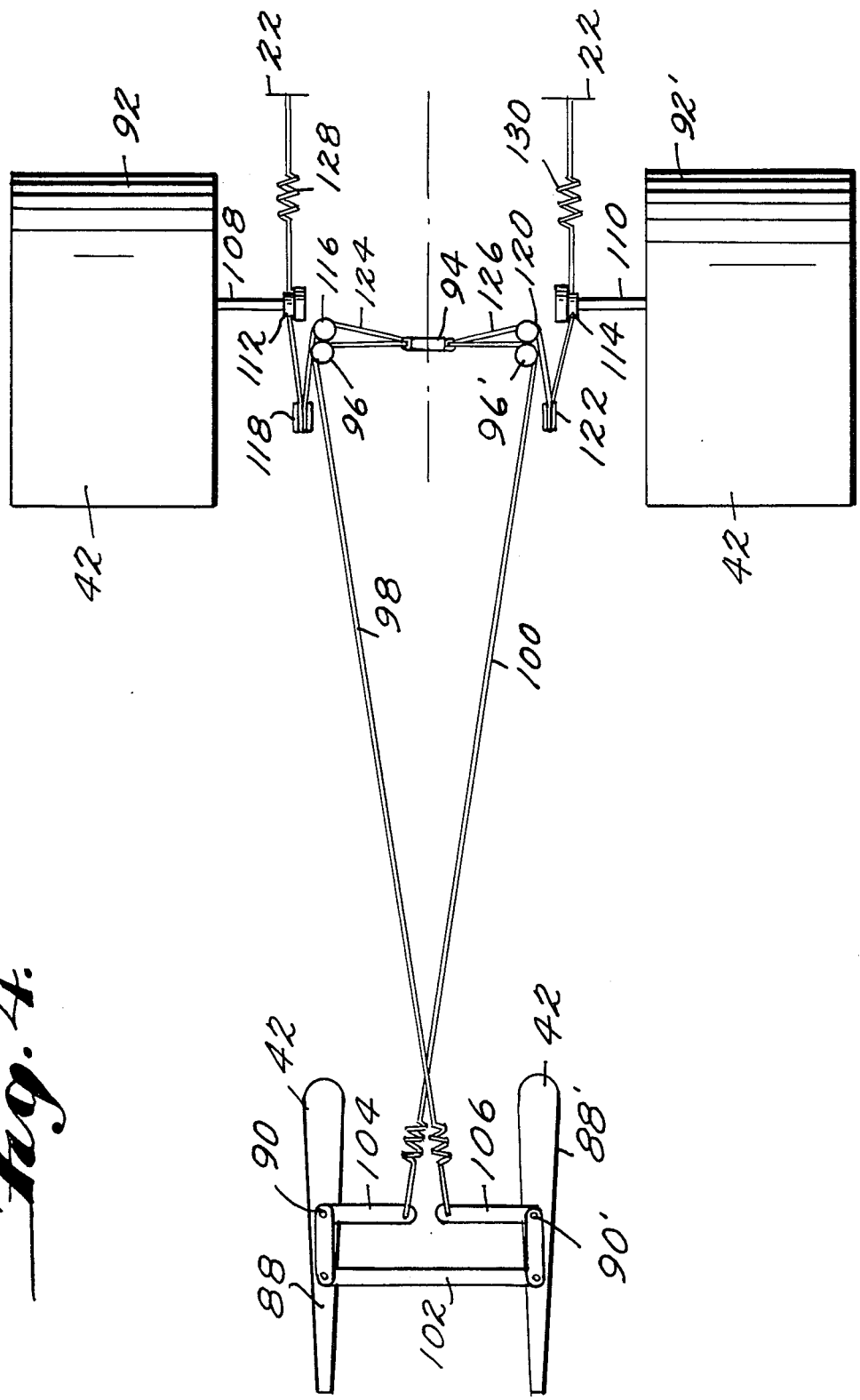

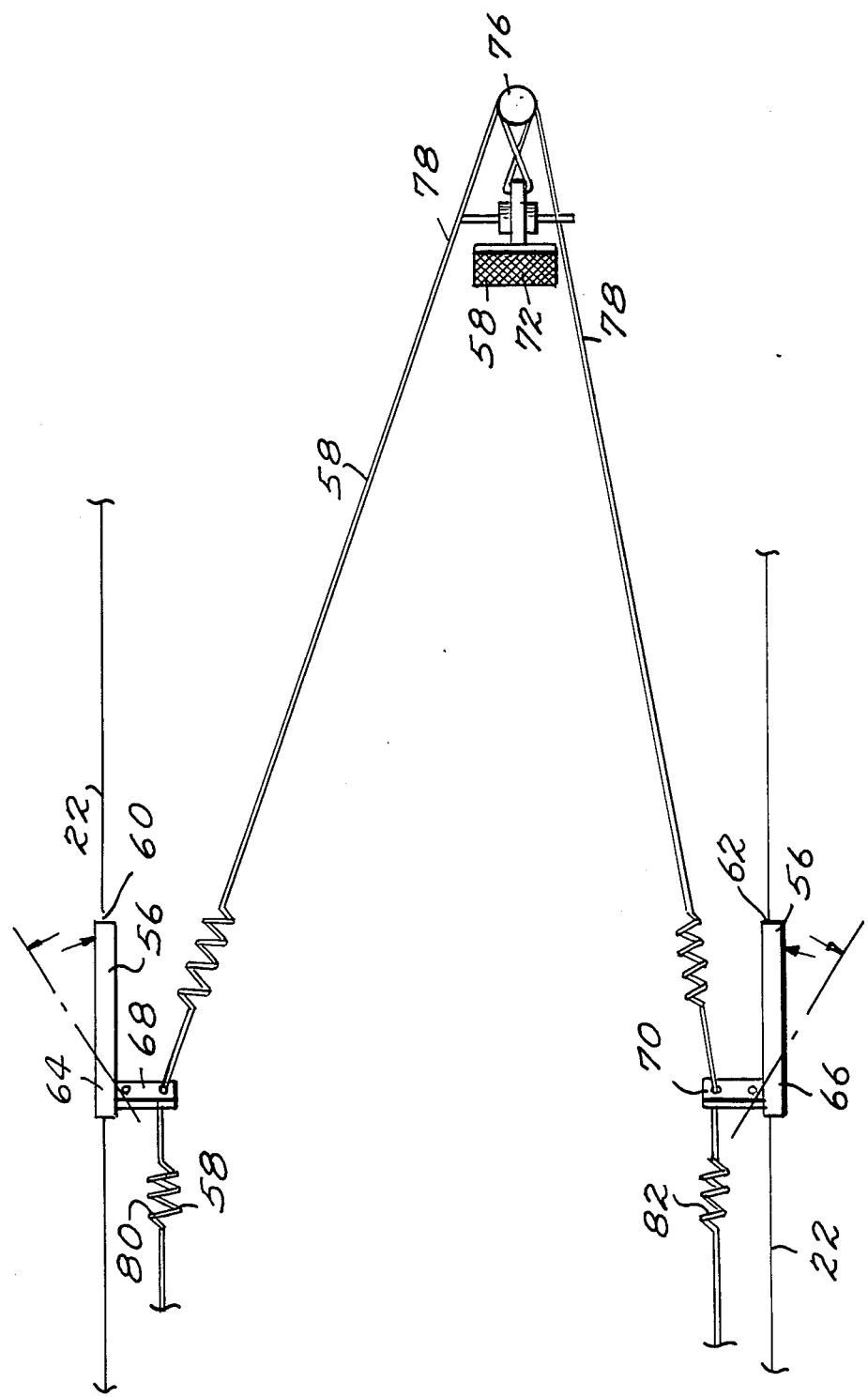

AMPHIBIOUS AIR CUSHION VEHICLE

This invention relates to an amphibious vehicle and more particularly to an amphibious air cushion vehicle.

Although various types of air cushion vehicles are known, they have not proved entirely satisfactory under all conditions of service. It is, therefore, an object of the present invention to provide an amphibious air cushion vehicle which provides improved operating features.

A further object is the provision of an amphibious air cushion vehicle which utilizes a single fan simultaneously providing lift and forward motion to the vehicle.

Another object is to provide an amphibious air cushion vehicle in which forward motion is controlled by rearward escape of pressurized air from an air containment compartment beneath the vehicle.

A further object of the invention is the provision of an amphibious air cushion vehicle having an inflatable tube which is filled with a lighter-than-air gas to provide added lift and bouyancy for the vehicle.

Still another object is to provide an amphibious air cushion vehicle wherein the forward portion of the vehicle can be selectively raised to enable the vehicle to pass over obstructions.

A still further object of the invention is to provide an amphibious air cushion vehicle which can be steered by operation of a single steering element.

Additional objects and advantages of the invention will be set forth in part in the description which follows, and in part will be obvious from the description, or may be learned by practice of the invention. The objects and advantages are realized and attained by means of instrumentalities and combinations particularly pointed out in the appended claims.

To achieve these and other objects the present invention includes a body defining an air containment wall; an inflatable tube attached to the body and defining a rearward opening; an air containment curtain attached to the tube and cooperating with the wall, with the tube and with the land or water upon which the vehicle is positioned to form an air containment compartment when pressurized air fills the compartment; a fan positioned within the body and in fluid communication with the compartment to force pressurized air into the compartment; means in operative relationship with the fan for controlling operation of the fan; gate means in operative relationship with the body and the opening for selectively enabling pressurized air to exit rearwardly through the opening from the compartment to impart forward motion to the vehicle; means in operative relationship with the gate means for controlling operation of the gate means to control forward movement of the vehicle; means attached to the body for steering the vehicle; and means in operative relationship with the steering means for controlling operation of the steering means.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, serve to explain the principles of the invention.

FIG. 3 is a fragmentary diagrammatic top plan view of the vehicle;

FIG. 4 is a diagrammatic view of the steering mechanism of the vehicle; and

FIG. 5 is a diagrammatic view of the braking mechanism of the vehicle.

Figure 1:
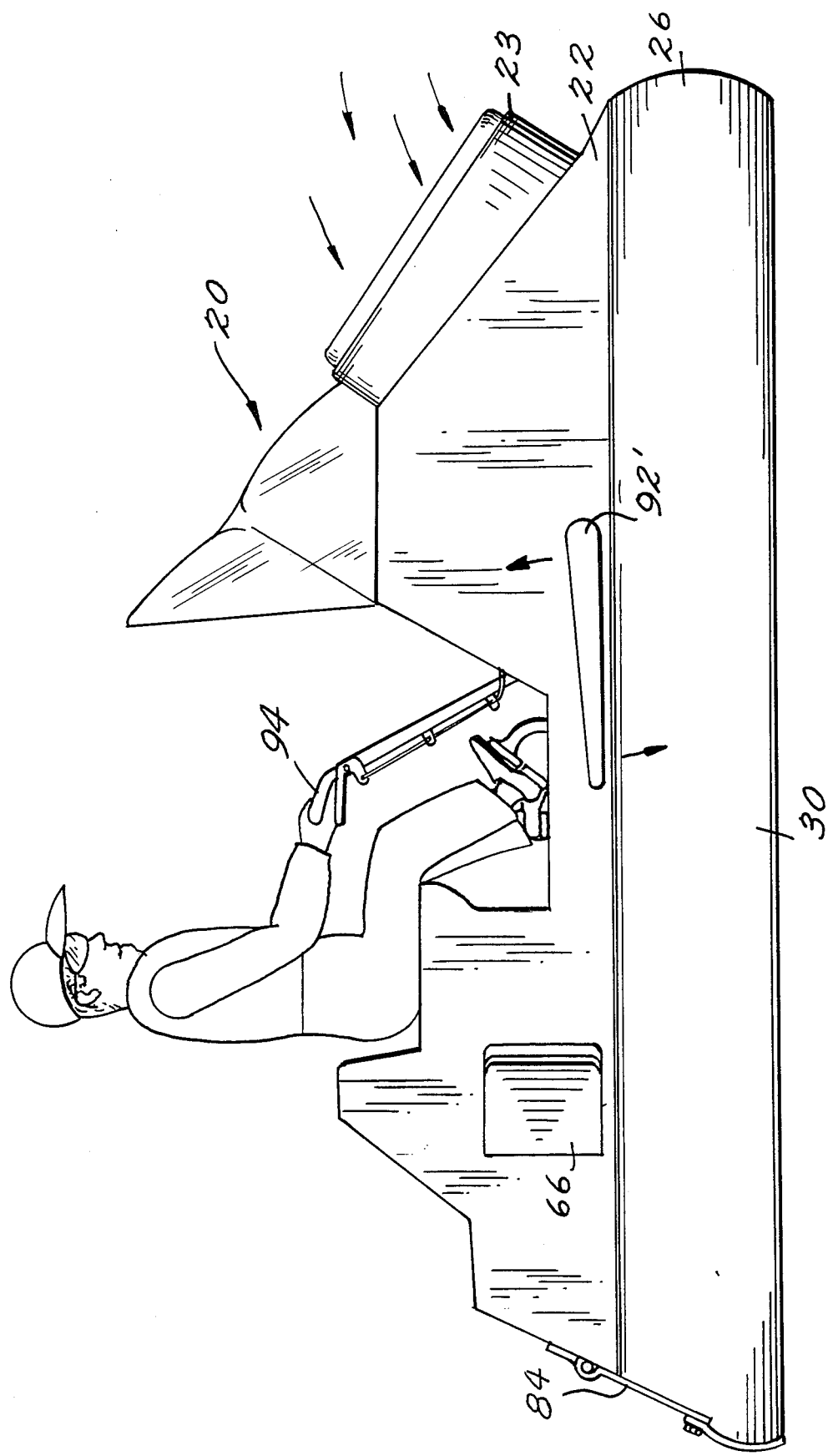
FIG. 1 is a side elevation view of the vehicle.
Figure 2:
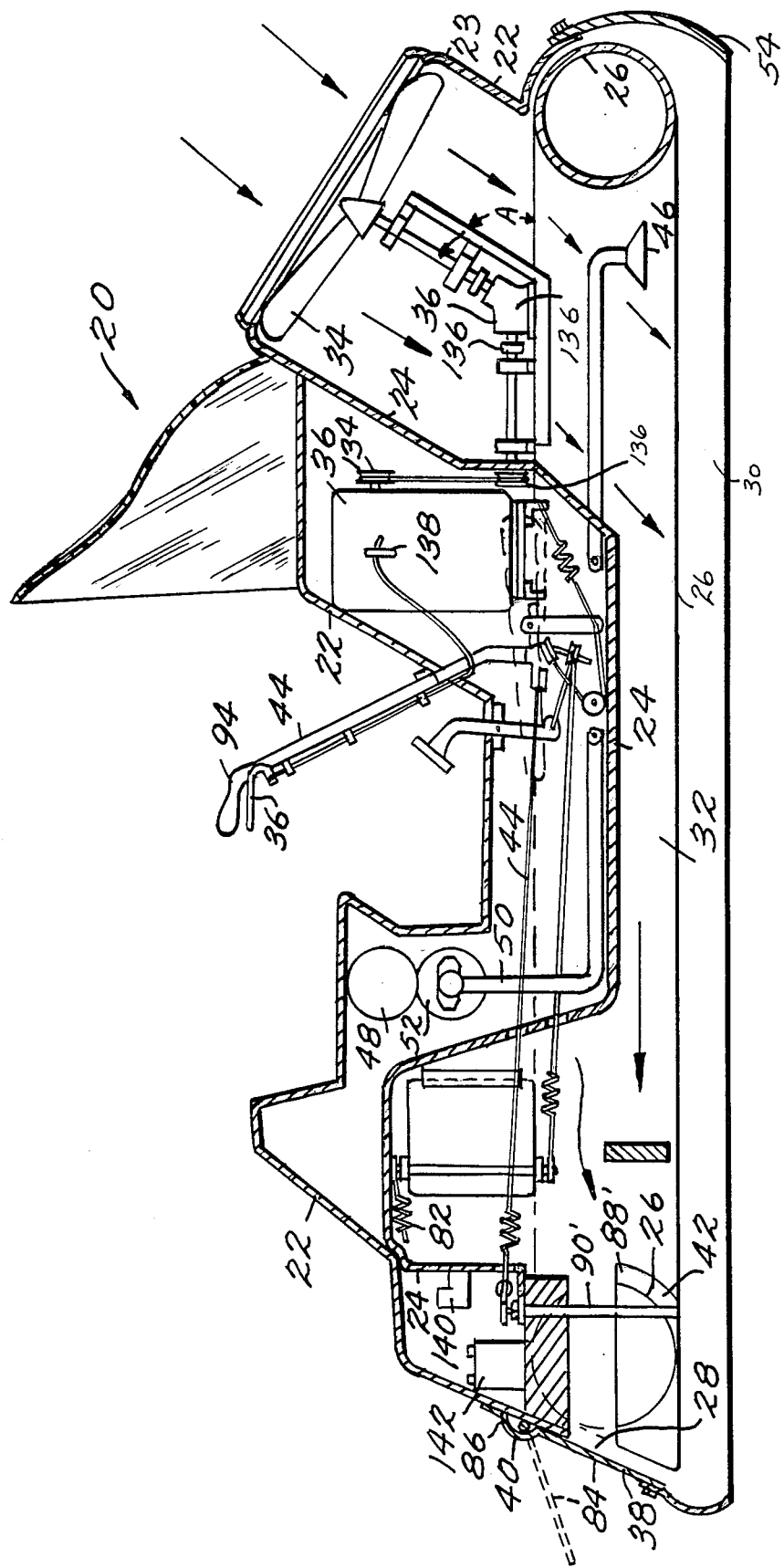
FIG. 2 is a side elevation view, partly in section, of the vehicle.

With reference now to the drawings, wherein like reference characters designate like or corresponding parts throughout the several views, there is shown an amphibious air cushion vehicle 20 which includes a body 22 defining an air containment wall 24. An inflatable tube 26 is conventionally attached in substantially air-tight relationship to body 22, and tube 26 defines a rearward opening 28.

An air containment curtain 30 is conventionally attached in substantially air-tight relationship to tube 26 and cooperates with wall 24, with tube 26 and with the land or water upon which vehicle 20 is positioned to form an air containment compartment 32 when pressurized air fills the compartment. A fan 34 is positioned within body 22 and in fluid communication with compartment 32 to draw air from the ambient atmosphere and to force it into compartment 32. Means 36 are provided in operative relationship with fan 34 for controlling operation of the fan, and pressurized air accumulates within compartment 32 as fan 34 forces air into the compartment.

Gate means 38 are provided in operative relationship with body 22 and with rearward opening 28 for selectively enabling pressurized air to exit from compartment 32 rearwardly through opening 28 to impart forward motion to vehicle 20. Means 40, such as a spring, are provided in operative relationship with gate means 38 for controlling operation of gate means 38, which in turn controls forward movement of vehicle 20. Means 42 are attached to body 22 for steering vehicle 20, and means 44 are provided in operative relationship with steering means 42 for controlling operation of the steering means.

Vehicle 20 further includes nozzle means 46 positioned in a forward portion of compartment 32 and directed downwardly for discharging compressed air in a downward direction. A compressed air supply 48 is mounted on body 22, and means 50 are provided for connecting air supply 48 to nozzle 46 and for enabling the compressed air to travel from air supply 48 to nozzle means 46. Means 52 are provided in operative relationship with air supply 48 for controlling release of compressed air from supply 48 to nozzle means 46, whereby the forward portion 54 of vehicle 20 can be selectively raised to enable the vehicle to pass over obstructions which would otherwise impede forward motion of the vehicle. Air supply controlling means 52, for example, may include a conventional solenoid quick-release air valve.

In accordance with a preferred embodiment of the invention, fan 34 is positioned within cowling portion 23 of body 22 and at an angle A of between zero and ninety degrees with respect to the land or water upon which vehicle 20 is located. Angle A and the position of fan 34 may be adjustable to provide optimum lift and forward propulsion forces for vehicle 20, and tube 26 is preferably filled with a lighter-than-air gas, such as helium, to provide added lift and buoyancy for vehicle 20.

Means 56 are provided in operative relationship with body 22 for braking forward movement of vehicle 20, and means 58 are provided in operative relationship with braking means 56 for controlling operation of the braking means. More specifically, body 22 defines a first opening 60 on a left side of body 22 in fluid communication with compartment 32, and body 22 also defines a second opening 62 on a right side of body 22 in fluid communication with compartment 32. Braking means 56 preferably include a first shutter element 64 pivotally mounted on body 22 and rearwardly of first opening 60. Shutter element 64 is of a size and shape to cover opening 60 when shutter element 64 is in a closed position. Similarly, a second shutter element 66 is pivotally mounted on body 22 and rearwardly of second opening 62. Shutter element 66 is of a size and shape to cover second opening 62 when shutter element 66 is in a closed position. First shutter element 64 includes a first lever projection 68 extending inwardly from a rearward portion of first shutter element 64. Likewise, second shutter element 66 includes a second lever projection 70 extending inwardly from a rearward portion of second shutter element 66

Braking controlling means 58 preferably include a braking control element 72 positioned with respect to body 22 for activation by an operator of vehicle 20, and braking control element 72 defines a cable-receiving portion 74 therein. A braking control sheave 76 is positioned adjacent to control element 72, and a braking control cable 78 is attached to first lever projection 68. Cable 78 passes partially around control sheave 76, through cable-receiving portion 74, crosses itself between cable-receiving portion 74 and sheave 76, passes again partially around sheave 76, and is attached to second lever projection 70.

A first biasing element or spring 80 is provided in operative relationship with body 22 and with first lever projection 68 for normally maintaining first shutter element 64 in a closed position over first opening 60. Similarly, a second biasing element or spring 82 is provided in operative relationship with body 22 and with second lever projection 70 for normally maintaining second shutter element 66 in a closed position over second opening 62, whereby activation of braking control element 72 by the operator simultaneously rotates shutter elements 64 66 to open positions to permit pressurized air from compartment 32 to escape through openings 60, 62 in a forward direction to brake forward motion of vehicle 20.

In accordance with the invention, gate means 38 include a door 84 hingedly attached to body 22 and of a size and shape to cover opening 28 when in a closed position, whereby pressurized air from compartment 32 is substantially prevented from exiting from the compartment through opening 28 when door 84 is in a closed position.

Gate controlling means 40 include a spring 86 positioned to normally keep door 84 in a closed position, and spring 86 exerts a predetermined force against the door for enabling the door to open only when air in compartment 32 reaches a predetermined pressure to overcome the force of the spring.

Steering means 42 include rudder elements 88, 88' rotatably positioned within opening 28. Rudder elements 88, 88' are attached to shafts 90, 90', respectively, which are rotatably mounted with respect to body 22. Steering means 42 further include first and second wing elements 92, 92' rotatably attached to left and right exterior sides, respectively, of body 22.

Steering controlling means 44 are connected in operative relationship with rudder elements 88, 88' and with wing elements 92 92' for simultaneously controlling movements of elements 88, 88', 92 and 92'. More specifically steering controlling means 44 include a pivotally mounted steering lever 94, which is pivotally mounted with respect to body 22. First and second sheaves 96, 96' are positioned in proximity to lever 94, and a first cable 98 is attached to lever 94, passes over first sheave 96 and is attached to second rudder element 88'. Likewise, a second cable 100 is attached to lever 94, passes over second sheave 96' crosses first cable 98 and is attached to first rudder element 88.

A rigid connecting element 102 is attached to and extends between rudder elements 88 88' whereby the rudder elements are caused to rotate in synchronization with each other. First rudder element 88 also includes a first lever arm 104 projecting from rudder element 88. Second rudder element 88' includes a second lever arm 106 projecting from rudder element 88'. First cable 98 is attached to second lever arm 106, and second cable 100 is attached to first lever arm 104. First lever arm 104 is preferably attached to first rudder element shaft 90, and second lever arm 106 is preferably attached to second rudder element shaft 90'.

In accordance with the invention, steering means 42 further include a first shaft 108 attached to first wing element 92 and rotatably attached to body 22. A second shaft 110 is attached to second wing element 92' and is rotatably attached to body 22. A first lever member 112 is attached to first shaft 108, and a second lever member 114 is attached to second shaft 110. Third sheave 116 fourth sheave 118, fifth sheave 120, and sixth sheave 122 are positioned in proximity to steering lever 94 A third cable 124 is attached to steering lever 94, passes over sheaves 116, 118 and is attached to first lever member 112 Similarly, a fourth cable 126 is attached to steering lever 94, passes over sheaves 120, 122 and is attached to second lever member 114.

First means 128 are provided in operative relationship with first lever member 112 for continuously applying forces to first lever member 112 in opposition to forces applied to lever member 112 by cable 124. Likewise, second means 130 are provided in operative relationship with second lever member 114 for continuously applying forces to lever member 114 in opposition to forces applied thereto by cable 126. Steering lever 94 is pivotally mounted to body 22 at a point on the steering lever substantially one-third the length of the lever from the bottom thereof, and cables 98, 100, 124 and 126 are attached substantially at the lower end of steering lever 94 whereby maximum leverage and control are provided for the operator.

The size of opening 28 must be related to the size of engine 132 which drives fan 34. The size of opening 28 also must be related to the weight of vehicle 20, the size of compartment 32 and the size of fan 34 so that sufficient air pressure exists when door 84 opens to continuously propel vehicle 20 in a forward direction as long as door 84 remains open The relationship of these parameters can be readily determined by one of ordinary skill in the art from the teachings of this disclosure It is contemplated that the position of fan 34 and the magnitude of angle A be adjustable. As a result, changes in the relationship between lifting and propelling forces can be provided. Although not illustrated, it is also contemplated that additional openings in body 22 and associated shutters may be provided for enabling vehicle 20 to be propelled in a rearward direction and for further assisting in braking of the vehicle.

In operation, air-cooled gasoline engine 132 is coupled to multi-bladed fan 34 through a centrifugal clutch 134 and a pulley, shaft and gear box arrangement 136. Engine 132 is controlled from a console attached to body 22 and located in front of the operator. As throttle 138 is advanced, centrifugal clutch 134 engages and drive system 136 causes fan 34 to turn. As the fan speed increases, air is drawn inwardly by the fan and is forced downwardly through cowling 23 into compartment 32. When the contained air pressure within compartment 32 creates a vertical force equal to the total dead weight of vehicle 20, the vehicle will be raised on a curtain of air. The pressurized air will be contained within compartment 32 by means of curtain 30 and door 84.

A further increase in the speed of fan 34 will cause a further increase in the pressure of the air within compartment 32, and at a predetermined level of air pressure within compartment 32 spring 86 will allow door 84 to pivot open. As a result, pressurized air will flow from compartment 32 through rearward opening 28. Such rearward movement of pressurized air provides a reaction which propels vehicle 20 in a forward direction. The speed of movement of the vehicle can be controlled by controlling the speed of fan 34.

Steering control of vehicle 20 is provided by steering lever 94, which is operated by the driver. Leftward movement by the driver of the upper portion of steering lever 94 causes rudder elements 88 88' to simultaneously be rotated about their shafts 90, 90' to cause a leftward turning motion of the vehicle as it moves in a forward direction. Similarly, a rightward movement by the operator of the upper portion of steering lever 94 causes rudder elements 88, 88' to rotate about shafts 90, 90' to cause a rightward turning motion of the vehicle as it moves in a forward direction.

Vehicle 20 is also capable of traversing obstacles in its path, such as logs or rough ground. For example, when an obstacle is encountered which stops forward motion of the vehicle, the operator engages a switch (not shown) which causes solenoid quick-release air valve 52 to open. Air from compressed air tank 48 then passes through air supply connecting means 50, and a blast of air is ducted to compressed air discharge nozzle 46 at the forward portion of vehicle 20. This downward blast of compressed air creates a large upward reactive force which causes the forward portion of vehicle 20 to lift, thereby allowing the vehicle to traverse the obstacle. Compressed air tank or tanks 48 are recharged with air from an electric air compressor 140, which is driven by means of battery 142. Battery 142, in turn, is recharged from engine 132, which has an integral generator (not shown).

Braking of vehicle 20 is accomplished by stopping or reducing the speed of fan 34. Braking of the vehicle is also accomplished by depression of foot pedal 72. Depression of pedal 72 causes shutter elements 64, 66 to rotate into open positions with respect to openings 60, 62 in body 22. As a result, compressed air escapes from compartment 32 and through openings 60, 62 to be deflected in a forward direction by shutter elements 64, 66. This deflection of compressed air in a forward direction causes a reactive force in a rearward direction to slow the vehicle. Shutter elements 64, 66 are preferably rotatably mounted to body 22 to permit each of the shutter elements to be rotated through a maximum angle of 90 degrees.

The invention in its broader aspects is not limited to the specific details shown and described, and departures may be made from such details without departing from the principles of the invention and without sacrificing its chief advantages.

What is claimed is:

1. An amphibious air cushion vehicle, comprising:
   a body defining an air containment wall;
   an inflatable tube attached across the front and to the sides of said body and defining a rearward opening;
   an air containment curtain attached to said tube in operative relationship with said wall, with said tube and with the land or water upon which said vehicle is positioned for forming an air containment compartment when pressurized air fills said compartment;
   a fan positioned within said body and in fluid communication with said compartment to force pressurized air into said compartment;
   means in operative relationship with said fan for controlling operation of said fan;
   gate means in operative relationship with said body and said opening for selectively enabling pressurized air to exit rearwardly through said opening from said compartment to impart forward motion to said vehicle;
   means in operative relationship with said gate means for controlling operation of said gate means to control forward movement of said vehicle;
   means attached to said body for steering said vehicle; and
   means in operative relationship with said steering means for controlling operation of said steering means.

2. A vehicle as in claim 1 further including
   nozzle means positioned in a forward portion of said compartment and directed downwardly for discharging compressed air in a downward direction;
   a compressed air supply mounted on said body;
   means connecting said air supply to said nozzle means for enabling said compressed air to travel from said air supply to said nozzle means; and
   means in operative relationship with said air supply for controlling release of compressed air from said supply to said nozzle means, whereby the forward portion of said vehicle can be selectively raised to enable the vehicle to pass over obstructions which would otherwise impede forward motion of said vehicle.

3. A vehicle as in claim 1 wherein said fan is positioned at an angle of substantially between zero and ninety degrees with respect to the land or water upon which said vehicle is located.

4. A vehicle as in claim 1 wherein said tube is filled with a lighter-than-air gas, such as helium, to provide added lift and buoyancy for said vehicle.

5. A vehicle as in claim 1 further including means in operative relationship with said body for braking forward movement of said vehicle; and means in operative relationship with said braking means for controlling operation of said braking means.

6. A vehicle as in claim 1 wherein said gate means include a door hingedly attached to said body and of a size and shape to cover said opening when in a closed position, whereby pressurized air from said compartment is substantially prevented from exiting from said compartment through said opening when said door is in said closed position.

7. A vehicle as in claim 6 wherein said gate controlling means include a spring positioned to normally keep said door in a closed position and exerting a predetermined force against said door for enabling said door to open when said air in said compartment reaches a predetermined pressure.

8. A vehicle as in claim 1 wherein said steering means include at least one rudder element rotatably positioned within said opening.

9. A vehicle as in claim 8 wherein said steering means further include first and second wing elements rotatably attached to left and right exterior sides, respectively, of said body.

10. A vehicle as in claim 9 wherein said steering controlling means are connected in operative relationship with said rudder element and with said wing elements for simultaneously controlling movements of said rudder element and said wing elements.

11. A vehicle as in claim 10 wherein said steering means include first and second rudder elements and wherein said steering controlling means include:
   a steering lever pivotally mounted with respect to said body;
   first and second sheaves positioned in proximity to said lever;
   a first cable attached to said lever, passing over said first sheave and attached to said second rudder element; and
   a second cable attached to said lever, passing over said second sheave, crossing said first cable and attached to said first rudder element.

12. A vehicle as in claim 11 further including a rigid connecting element attached to and extending between said first and said second rudder elements, whereby said rudder elements rotate in synchronization with each other.

13. A vehicle as in claim 12 wherein said first rudder element includes a first lever arm projecting from said first rudder element and wherein said second rudder element includes a second lever arm projecting from said second rudder element, said first cable attached to said second lever arm and said second cable attached to said first lever arm.

14. A vehicle as in claim 13 wherein said steering means further include:
   a first shaft attached to said first wing element and rotatably attached to said body;
   a second shaft attached to said second wing element and rotatably attached to said body;
   a first lever member attached to said first shaft;
   a second lever member attached to said second shaft;
   third, fourth, fifth and sixth sheaves positioned in proximity to said lever;
   a third cable attached to said steering lever, passing over said third and fourth sheaves and attached to said first lever member;
   a fourth cable attached to said steering lever, passing over said fifth and sixth sheaves and attached to said second lever member;
   first means in operative relationship with said first lever member for continuously applying forces to said first lever member in opposition to forces applied to said first lever member by said third cable; and
   second means in operative relationship with said second lever member for continuously applying forces to said second lever member in opposition to forces applied to said second lever member by said fourth cable.

15. A vehicle as in claim 14 wherein said steering lever is pivotally mounted to said body at a point on said steering lever substantially one-third the length of said steering lever from the bottom of said steering lever and wherein said first, second, third and fourth cables are attached substantially at the lower end of said steering lever 16. A vehicle as in claim 5 wherein said body defines a first opening on a left side of said body in fluid communication with said compartment and wherein said body defines a second opening on a right side of said body in fluid communication with said compartment, said braking means including:
   a first shutter element pivotally mounted on said body and rearwardly of said first opening said first shutter element of a size and shape to cover said first opening when in a closed position; and
   a second shutter element pivotally mounted on said body and rearwardly of said second opening, said second shutter element of a size and shape to cover said second opening when in a closed position.

17. A vehicle as in claim 16 wherein said first shutter element includes a first lever projection extending inwardly from a rearward portion of said first shutter element and wherein said second shutter element includes a second lever projection extending inwardly from a rearward portion of said second shutter element.

18. A vehicle as in claim 17 wherein said braking controlling means include:
   a braking control element in aperture relationship with said body for activation by an operator of said vehicle and defining a cable-receiving portion therein;
   a braking control sheave positioned adjacent to said braking control element;
   a braking control cable attached to said first lever projection, passing partially around said control sheave, passing through said cable-receiving portion, crossing itself between said cable-receiving portion and said control sheave, passing again partially around said control sheave, and attached to said second lever projection;
   a first biasing element in operative relationship with said body and with said first lever projection for normally maintaining said first shutter element in a closed position over said first opening; and
   a second biasing element in operative relationship with said body and with said second lever projection for normally maintaining said second shutter element in a closed position over said second opening, whereby activation of said braking control element by said operator simultaneously rotates said shutter elements to open positions to permit pressurized air from said compartment to escape through said openings in a forward direction to brake forward motion of said vehicle.

* * * * *